United States Patent

Stanley et al.

[11] Patent Number: 5,961,905
[45] Date of Patent: Oct. 5, 1999

[54] METHOD OF MOLDING UNITARY ROLLER OF HOMOGENEOUS MATERIAL FOR TAPE CARTRIDGE

[75] Inventors: Donald Stanley; Kenneth Sheppard, both of San Diego, Calif.; Ritchie J. Lee, Harrisburg, N.C.

[73] Assignee: Verbatim Corporation, San Diego, Calif.

[21] Appl. No.: 09/134,541

[22] Filed: Aug. 13, 1998

Related U.S. Application Data

[62] Division of application No. 08/862,635, May 23, 1997.

[51] Int. Cl.$^6$ .................................................. B29C 45/73
[52] U.S. Cl. ...................................... 264/105; 264/328.16
[58] Field of Search ..................................... 264/104, 105, 264/328.1, 328.16, 328.14, 331.14, 319

[56] References Cited

U.S. PATENT DOCUMENTS

| | | | |
|---|---|---|---|
| 3,601,335 | 8/1971 | Dopkins et al. | 242/199 |
| 3,659,797 | 5/1972 | Coy | 242/55.19 A |
| 3,692,255 | 9/1972 | Von Behren | 242/192 |
| 3,829,040 | 8/1974 | Nelson | 242/197 |
| 4,262,860 | 4/1981 | Hurtig et al. | 242/192 |
| 4,607,808 | 8/1986 | Collins | 242/192 |
| 4,635,877 | 1/1987 | Oishi | 242/197 |
| 5,236,784 | 8/1993 | Kobayashi et al. | 428/408 |
| 5,448,440 | 9/1995 | Law | 360/132 |
| 5,690,292 | 11/1997 | Sano | 242/340 |
| 5,702,065 | 12/1997 | Badour et al. | 242/342 |
| 5,755,392 | 5/1998 | Badour et al. | 242/342 |
| 5,765,772 | 6/1998 | Bay et al. | 242/342 |

FOREIGN PATENT DOCUMENTS

| | | |
|---|---|---|
| 0 667 617 A2 | 7/1995 | European Pat. Off. . |
| WO 91/13017 | 9/1991 | WIPO . |
| WO 95/20221 | 7/1995 | WIPO . |
| WO 96/08820 | 3/1996 | WIPO . |
| WO 97/01170 | 1/1997 | WIPO . |

*Primary Examiner*—Angela Ortiz
*Attorney, Agent, or Firm*—Fenwick & West, LLP

[57] ABSTRACT

A drive roller for a belt-driven tape cartridge is molded of composite polymeric material in a single step to include outer segment and inner segment integrally formed together with a radial web segment between the outer and inner segments to provide highly concentric operating surfaces on the outer segment and in the inner segment. Electrical conductivity throughout the molded drive roller is provided by including in the composite material a quantity of carbon powder, and selective shrinkage of the composite material during cooling from molding temperatures provides desirable bearing surface within the inner bore through the inner segment. Thrust bearing surfaces at the ends of the inner segment engage mating bearing surfaces that include lubricant traps to inhibit migration of lubricant away from the bearing surfaces of the drive roller. Stepped inner bore and axially spaced corresponding stepped axle diameters promotes lower frictional drag, provides a reservoir for lubricant, and facilitates removal of the molded component from its molding cavity.

4 Claims, 3 Drawing Sheets

METHOD OF MOLDING UNITARY ROLLER OF HOMOGENEOUS MATERIAL FOR TAPE CARTRIDGE

RELATED APPLICATIONS

This is a divisional of co-pending application Ser. No. 08/862,635 filed on May 23, 1997, which is incorporated by reference herein in its entirety.

FIELD OF THE INVENTION

This invention relates to magnetic tape cartridges, and more particularly to a drive roller for a belt-driven tape cartridge.

BACKGROUND OF THE INVENTION

Data tape cartridges are commonly used for the storage of electronic data signals and typically include a metal base-plate with pins and posts extending upwardly from the base plate to support belt rollers, reel hubs, a drive roller, and tape guides. The tape alignment must be precise for the writing or reading of the desired data signals on the tape. Therefore, it is very important that the pins and posts maintain their alignment during cartridge use. This is in clear distinction to tape cassettes which merely house a length of tape on hubs that require external support for movement of tape over a tape path that is determined by external tape guides. Tape cartridges therefore are essentially self-contained machines which require precision placement and elevational orientation of internal tape guides and internal supporting pins for rotatable components.

The tape in such a tape cartridge is moved bidirectionally from one reel of tape to another reel of tape along a tape path near a forward edge of the cartridge by the action of a flexible, resilient drive belt disposed along a belt path which overlays the outer convolutes of tape on the two reels and wraps around a drive roller positioned near the forward edge. Tape cartridges of this type are disclosed in the literature (see, for example, U.S. Pat. Nos. 3,692,255 and 4,262,860). The drive roller thus serves as the intermediate coupling between a rotating capstan shaft or roller in a tape drive unit and the belt which then contacts the outer layers of tape moving between reels. The drive roller is commonly disposed near the center of the forward edge of the tape cartridge with an upper portion of largest diameter protruding from the cartridge to engage the capstan shaft or roller of the tape drive unit, and with a lower portion of smaller diameter aligned with the drive belt and forming a part of the belt path.

Several significant characteristics of the drive roller contribute to precision performance of the tape cartridge. Specifically, true concentricity of the upper and lower portions of the drive roller relative to their common central axis promotes more uniform rate of displacement of the belt, and hence of the tape, with respect to the rate of rotation of the drive roller. In addition, the drive roller may be electrically conductive to inhibit the buildup of electrostatic charge on the drive roller and drive belt. Also, the drive roller requires close-tolerance rotational and translational bearing surfaces to assure accurate alignment relative to the drive belt.

Many of these desirable characteristics for a drive roller may be readily achieved in a machined component at high unit cost, but are difficult to achieve in a molded component at substantially lower unit cost. Polymeric materials and metals are common moldable materials, but for molded components such as a drive roller having some degree of resilience, and for molding convenience and lower costs, polymeric materials are preferred because of wide diversity of available properties, and finished components requiring no further machining are produced by the molding process. However, most polymeric materials are not electrically conductive, and have a tendency to shrink and otherwise distort from precision dimensions following removal from a mold.

SUMMARY OF THE INVENTION

In accordance with the present invention, an improved drive roller for tape cartridges is molded of a composite polymeric material to final precision dimensions using a molding process that produces an electrically conductive roller of high dimensional accuracy, and at low cost. The molded roller may include various bearing configurations for containing a quantity of lubricant. The molding process and associated mold includes one or more cavities for producing the drive rollers from the composite polymeric material and conductive particles that is heated to viscous fluid condition for injection into the mold cavities. Sprues and gates for introducing the viscous polymeric material into the mold cavities are oriented relative to the cavities to promote final formation of drive rollers without requiring machining of the substantially homogeneous, integrated drive rollers having finished bearing surfaces, electrical conductivity, and highly-concentric operating surfaces.

DETAILED DESCRIPTION OF THE INVENTION

Figure 1:
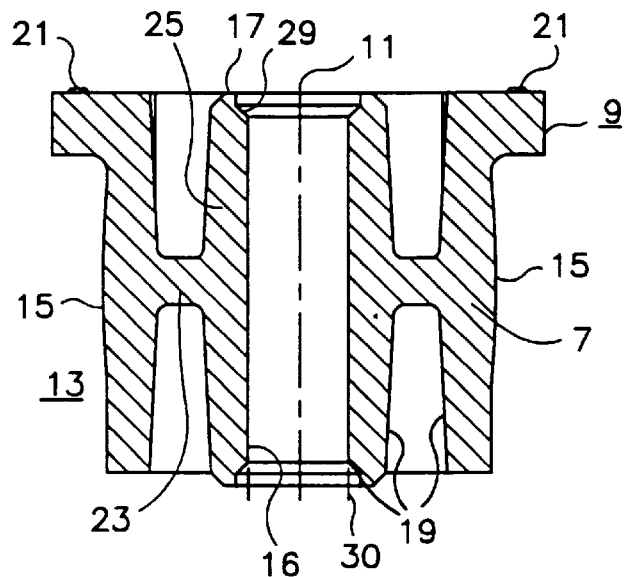
FIG. 1 is a cross-sectional view through the diametric plane of the drive roller of the present invention.

Referring now to FIG. 1, there is shown a cross-sectional view of the drive roller 7 of the present invention including an upper region 9 of maximum diameter of the generally concentric structure about the central axis 11. The outer perimeter of this upper region 9 serves as the driven surface that contacts a capstan shaft or roller of a tape drive unit. This driven surface 9 must be devoid of surface imperfections that could contribute operational vibration, and must also exhibit highly precise concentricity relative to the central axis 11 and to the lower belt-driving portion 13, ideally without requiring any machining following extraction of the finished component from the mold. The lower belt-driving portion 13 includes a crowned surface 15 for retaining a flexible, resilient drive belt centered on the belt-driving concentric surface in known manner. The inner bore 16 about the central axis 11 and passing through the inner barrel segment 25 of the drive roller 7 serves as a precision bearing surface for close-tolerance rotational engagement about a supporting pin or axle. In addition, the lateral ends 17, 19 of the central region of the drive roller 7 serve as thrust bearings of precision finish and overall dimensions, ideally without requiring any machining following extraction of the finished drive roller from the mold.

The integral structure of the drive roller 7 is formed in a single-shot molding operation from a composite polymeric material that includes about 70% by weight of grade #6-12 nylon (commercially available from Compounding Technology, Inc. as "CTX922-2 and CTX922-3"), and about 15% by weight of PTFE (polytetrafluoroethylene). In addition, about 15% by weight of carbon powder is included to promote electrical conductivity throughout the molded drive roller from outermost peripheries of upper and lower regions 9, 13 to the inner bore 16 that contacts a pin or axle. The ingredients of the composite polymeric material are combined in granular or pellet form, and are heated for the molding process to elevated temperatures in the range of about 450° F. to about 510° F. to provide a viscous, fluid composition that is suitable for injection into a heated cavity mold of the inverse, precision form of the finished drive roller 7. The ratios of ingredients of the composite polymeric material may be varied within confined limits of about±1% to retain electrical conductivity without adversely affecting the wear properties of the inner bore 16 as a bearing surface, and to retain good concentricity following cooling and material shrinkage.

Figure 2:
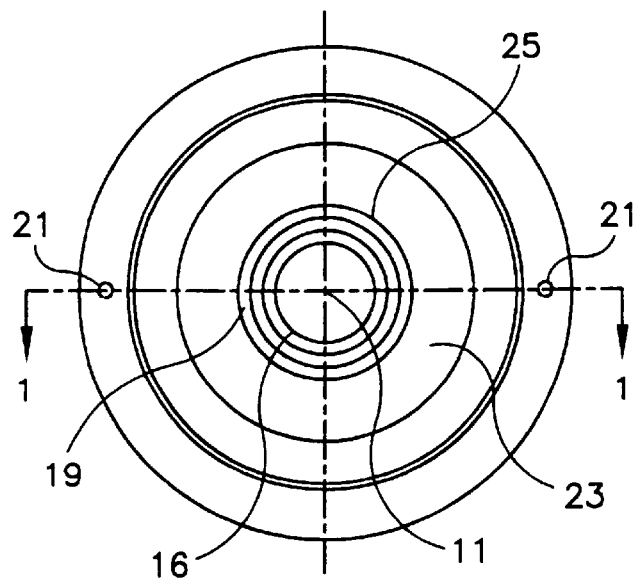
FIG. 2 is an end view of the lower region of the drive roller of FIG. 1 illustrating the locations of plural gates at which molding material is supplied.

Referring now to FIG. 2, there is shown a pictorial diagram of the end of the lower region of the drive roller of FIG. 1 illustrating the plural gate locations 21 on the upperside of the upper region 9 of the finished drive roller at which the molding material was supplied. These plural locations at which the molding material is supplied, coupled with the orientation of the flange-like web 23 at approximately the center between ends 17, 19 of the inner barrel segment 25, promote a high degree of concentricity of the outer peripheries of the upper region 9 and lower region 13 relative to the central axis 11 of the inner bore 16. Further, these gate locations 21, when separated from the mold, may leave an anomalous shape, or 'gate remnant' of molding material attached to the upperside-of the upper region 9 of greater diameter, but such gate remnant does not interfere with the operation of the drive roller 7 when functionally engaged about the outer periphery by a capstan drive shaft or roller, or when moving a drive belt engaged with the crowned periphery 15 of the lower region 13.

Figure 4:
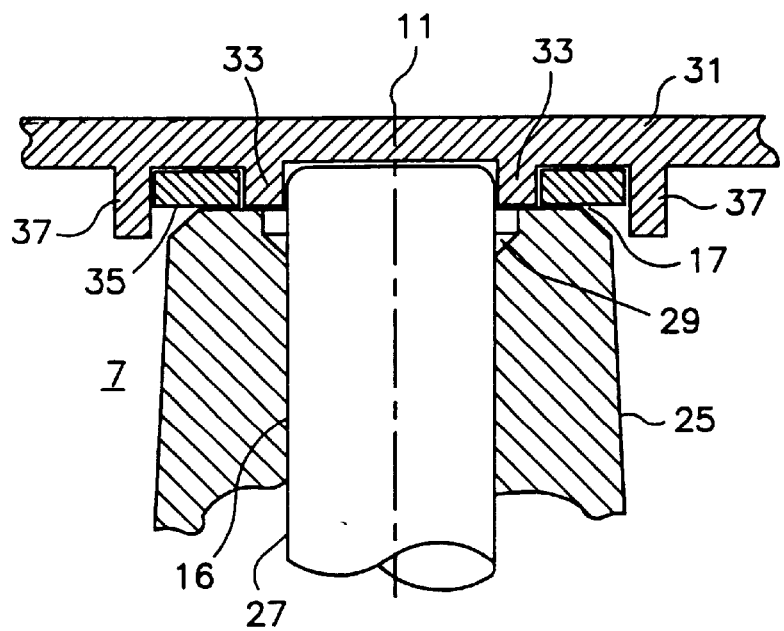
FIG. 4 is a partial sectional view of an end bearing on the drive roller of FIG. 1 rotatably assembled on a support pin in a tape cartridge.

In addition, because of volumetric shrinkage of the molding material as the integrally-molded drive roller cools down from the elevated casting temperatures, the radial flange-like web 23 having a thickness of about 0.055" shrinks and pulls radially inwardly against the crowned periphery 15 of the lower region 13 that has a wall thickness of about 0.060" and, more importantly, also shrinks and pulls radially outwardly against the inner barrel segment 25 that has a wall thickness of about 0.067." This shrinkage in selected web and barrel thicknesses has the effect of expanding slightly the diameter of the inner bore 16 near the middle between ends 17, 19. Such slightly expanded diameter of the inner bore 16 near the middle thereof promotes reduced frictional drag of the bearing formed thereby against a supporting pin or axle 27, as shown in FIG. 4, and also serves as a reservoir for grease or other lubricant disposed between the inner bore 16 and the supporting pin or axle 27. The relative thickness dimensions of the radial flange-like web 23 and the walls of the inner barrel segment 25 are selected to accomplish the aforementioned expansion of the inner bore 16 and may be varied within the ranges of about±5% of the thickness described above without adverse degradation of true concentricity. In addition, the thickness of the radial flange 23 promotes uniform flow of molding material from the outer barrel segment 9, 13 to the inner barrel segment 25 to form precision bearing surfaces in the inner bore 16 and at the upper and lower ends 17, 19. Wider variations in the thickness of the radial web 23 have been observed to adversely affect the pocket or reservoir size for grease and, in the extreme, forms an inner wall configuration that promotes vibrations that causes mechanical noise.

Figure 3:
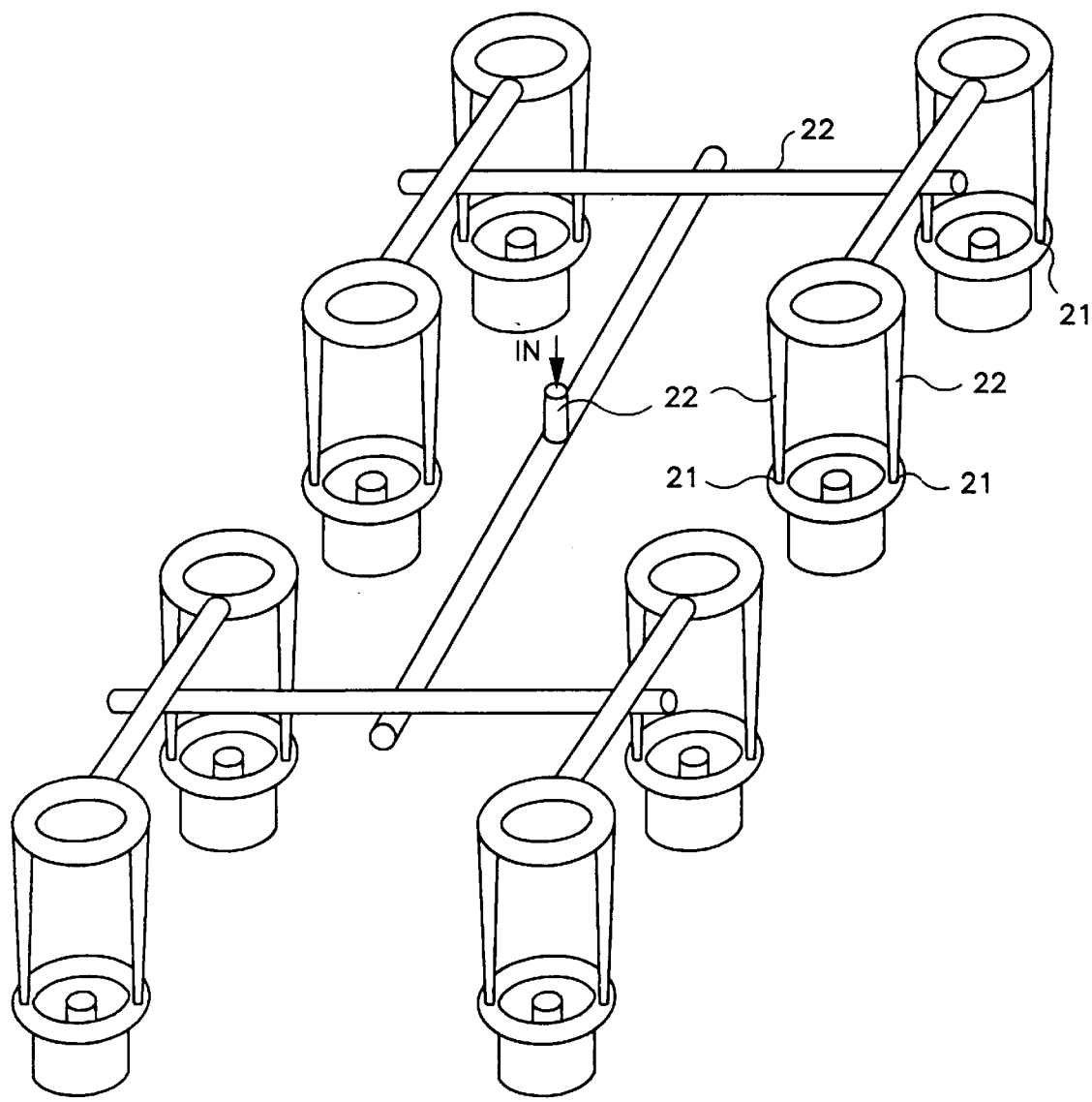
FIG. 3 is a perspective view of a computer-generated, line-segment drawing illustrating the sprue patterns for delivering molding material to the molds for forming drive rollers according to the present invention.

Referring now to FIG. 3, there as shown a computer-generated, line-segment drawing of the multi-cavity mold with associated sprues and gates within the dies that form the molding apparatus. Uniform delivery of molding material along sprues 22 to the plural gates 21 is preferred to assure uniform molded parts from all cavities. The gates 21 to each cavity are formed as approximately 0.045" diameter orifices into the mold that includes the upper region 9 of about 0.072" thickness and the radial flange 23 of about 0.055" thickness. The viscous molding material at the elevated molding temperature is injected into the sprues, gates and cavities under pressure to fill each cavity completely in approximately 0.6 seconds. In this way, the inflowing molding material enters a cavity via gates 21 disposed at diametrically spaced locations on the upper region 9, initially to flow together and downwardly into the outer barrel, and through the radial web 23 to the inner barrel 16. The fluid pressures in this molding configuration range from about 850 psi at the inlet gates 21 to about 300 psi in the region of the inner barrel 16. Ideally, then, a more uniform pressure distribution throughout the flange and outer barrel region, coupled with a more uniform pressure distribution throughout the inner barrel 16, fed through the web 23, promotes more uniformly round drive rollers 7, and significantly reduce latent 'weld lines' (where molding material flows together about the upper region 9 and outer barrel approximately midway between the locations of gates 21). In addition, the molded driver rollers 7 should be cooled down to solidification for ejection at about 360° F. in about 10–15 seconds, and in substantially uniform manner within about±3° C. around the drive roller 7 to assure a maximally-round molded part upon ejection from the cavity mold in conventional manner.

The mold may be operated at about 150–170° F., and the region thereof around a mandrel for forming the inner bore L6 may be operated at about 180°–200° F. By altering the mold thermal parameters in this manner, a 'resin-rich' composition with reduced concentration of carbon powder forms near the inner bore 16 of the inner barrel segment 25. The resulting molded surface exhibits good rotational wear characteristics against a steel axle 27, without undue wear degradation of the bearing attributable to carbon powder in the molded surface of the inner bore 16.

Referring now to FIG. 4, there is shown an exploded, partial sectional view of an end of the inner barrel segment 25 disposed relative to a lateral bearing to provide axial confinement of the drive roller 7 on the supporting pin or axle 27, as well as a lubricant trap to inhibit migration of lubricant from between the pin or axle 27 and the inner bore 16. Specifically, the upper end 17 of the inner barrel segment 25 includes an inner recess 29 of wider internal diameter than the inner bore 16 to serve as a reservoir for lubricant near the end of the bearing surfaces of axle 27 and inner bore 16. In the illustrated embodiment, a cover component 31 of the tape cartridge is supported by a base plate (not shown) that also supports the axle 27, and includes an integral retainer flange 33 positioned in close proximity (or press-fit engagement) about the upper end of the axle 27 to provide additional lateral support therefor. The retainer flange 33 may be integrally molded in concentric configuration about the axle 27 as part of the cover 31 (and optionally an absorptive insert such as an annulus of felt may be so positioned) using polycarbonate plastic material, with inner and outer diameters that provide some overlap with the inner and outer diameters of the upper end 17 about the reservoir 29. This provides thrust bearing surface to bear against the upper end 17 of the inner barrel segment 25. The outer retainer flange 37 is formed in the cover 31 in concentric orientation about the inner retainer flange 33 to extend below the cover 31 by a dimension that is greater than the distance below the cover of the interface between the upper end 17 of the inner barrel segment 25 and the inner retainer flange 33. The outer retainer flange 37 thus also serves as a shield against centrifugal ejection of lubricant from the bearing surface at the upper end 17. A volume of lubricant 35 may accumulate between inner 33 and outer 37 retainer flanges that are concentrically formed in the cover 31 (and optionally an absorptive insert such as an annulus of felt may be so positioned) to provide only tortuous routes for lubricant migrating away from the reservoir 29. A similar bearing surface, reservoir, and associated mounting may also be concentrically positioned about the axle 27 within the base plate (not shown) to serve as a thrust bearing and as a barrier to the migration of lubricant away from a similar reservoir 30 near the lower end 19 of the drive roller 7.

Figure 5:
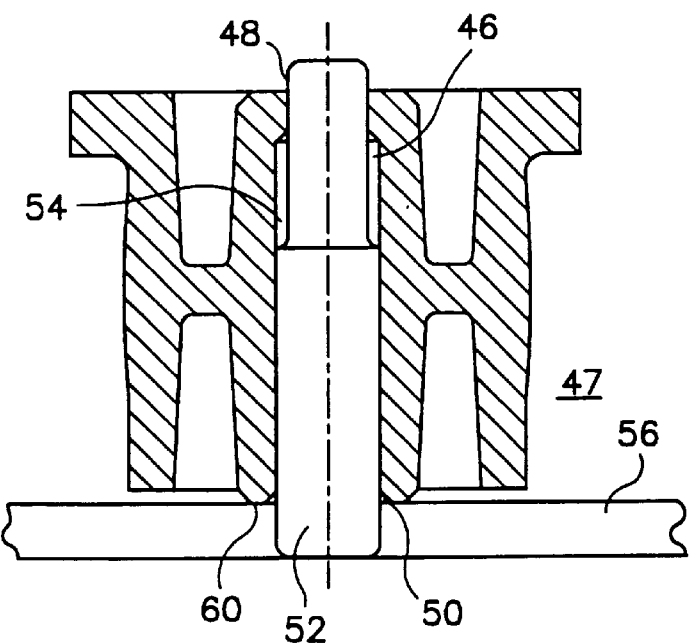
FIG. 5 is a sectional view through a diametric plane of another embodiment of a drive roller or rotatable component according to the present invention.

Referring now to the sectional view of a drive roller according to the embodiment illustrated in FIG. 5, there is shown an inner bore 46 having stepped or otherwise tapered inner diameters of different dimensions 48, 50 near the upper and lower ends of the roller. Specifically, the transition in inner bore diameters occurs intermediate the upper and lower ends, and an associated axle 52 includes upper and lower diameters that correspond to the respective upper and lower inner diameters 48, 50, but the transition in diameters occurs at an axial location spaced from the transition in inner bore diameters.

In this way, a reservoir: for lubricant is formed between the axially displaced step (or other taper) transitions of the inner bore 46 and axle 52. The axially displaced transition in inner bore and axle diameters also reduces the frictional contact of bearing surfaces and promotes stability and low-vibrational rotation due to the supporting bearing surfaces spaced toward the extreme ends of the axial dimensions of the roller 47. The supporting axle 52 may, of course, be mounted in perpendicular orientation relative to the base plate 56. A thrust-bearing lateral surface 60 may be formed on one (or both) ends of the roller 47 to provide low-friction axial thrust bearing against base plate 56, or other restraining surface oriented substantially normal to the axis of the inner bore 46. Of course, such other rotatable components of a tape cartridge such as the hubs or spools upon which tape is wound, and drive-belt idler rollers may also include such axially displaced transitions in inner bore and associated axle diameters to provide a reservoir of lubricant and diminished bearing surfaces for lower friction and lower noise rotation of the rotatable component about a corresponding axle having similar stepped transition in diameters. In such alternative configurations of rotatable components for which electrical conductivity is not required, the molding composition may be polycarbonate or acetyl resins. Also, such orientation of step transition in diameter of the inner bore of a rotatable component facilitate removal from a mold cavity since the expanding inner bore facilitates removal from a mandrel of the mold cavity (not shown) that has the diameters and stepped or tapered transition configuration required to mold the inner bore 16, 46 of the rotatable component.

Therefore, the design, dimensions, and molding parameters for a single-step molded drive roller assures highly precision molded parts at low cost with favorable operating conditions of highly concentric operating surfaces and electrical conductivity throughout the drive roller to the inner bore that contacts a supporting axle. In addition, a stepped transition in inner bore and axially displaced corresponding stepped transition in a mating axle provide diminished bearing surface for reduced frictional drag and lower noise rotation, and also provide a reservoir for grease or other lubricant between such rotatable component and associated axle.

What is claimed is:

1. A method for molding within a mold cavity a homogeneous drive roller having a body of concentric configuration with an outer segment that includes an upper region of largest outer diameter and a lower region of smaller outer diameter than the outer diameter of the upper region and that includes a crowned outer surface which is concentric with the upper region of largest diameter, and with an inner segment including an internal bore concentric with the outer diameters of the upper and lower regions, and with a web segment interposed in radial orientation in integral formation between the outer and inner segments near the crowned outer surface of the lower region of the outer segment, the method comprising the steps of:

introducing into the mold cavity which is operating at a temperature in the range from about 150–200° F. a composition of polymeric materials including grade #6–12 nylon and PTFE in viscous state at a temperature of about 510° F. within an interval of about 0.6 seconds; and cooling the composition to solid state within the mold cavity to complete formation of the drive roller.

2. The method according to claim 1 wherein the composition also includes carbon powder.

3. The method according to claim 1 wherein the composition is introduced into the mold cavity through plural gates substantially equally spaced about an upper edge of the upper region of greatest diameter, where such gates each comprise an orifice of approximately 0.045" diameter.

4. A method for molding within a mold cavity a homogeneous drive roller having a body of concentric configuration with an outer segment that includes an upper region of largest outer diameter and a lower region of smaller outer diameter than the outer diameter of the upper region and that includes a crowned outer surface which is concentric with the upper region of largest diameter, and with an inner segment including an internal bore concentric with the outer diameters of the upper and lower regions, and with a web segment interposed in radial orientation in integral formation between the outer and inner segments near the crowned outer surface of the lower region of the outer segment, and wherein the mold cavity includes a mandrel disposed therein to form the internal bore in the inner segment, the method comprising the steps of:

introducing into the mold cavity which is operating at a temperature in the range from about 150–200° F. a composition of polymeric materials including grade #6–12 nylon and PTFE in viscous state at a temperature of about 510° F. within an interval of about 0.6 seconds, and the operating temperature of the mandrel exceeds the operating temperature of the mold cavity about the outer segment and the inner segment and the web segment; and cooling the composition to solid state within the mold cavity to complete formation of the drive roller.

\* \* \* \* \*